June 22, 1926.

H. T. WOOLSON 1,589,779

THERMOSTAT FOR MOTOR VEHICLES

Filed April 12, 1926

Inventor

HARRY T. WOOLSON

By *King Harness*

Attorney

Patented June 22, 1926.

1,589,779

UNITED STATES PATENT OFFICE.

HARRY T. WOOLSON, OF DETROIT, MICHIGAN.

THERMOSTAT FOR MOTOR VEHICLES.

Application filed April 12, 1926. Serial No. 101,334.

It is the primary object of my invention to provide a cheap and economical thermostatically operated device for controlling the water passage of a motor vehicle such as is commonly used for connecting the internal combustion engine and the radiator of the vehicle.

It is a further object of my invention to provide a thermostatic device wherein the thermostatic metal disks used therein are flat in their normal position and the edges thereof rest against shoulders to form a seal.

With the above and other objects in view, my invention consists in the arrangement, combination and construction of the various parts of my improved device, as described in the specification, claimed in my claims and shown in the accompanying drawing, in which:

Figure 1:
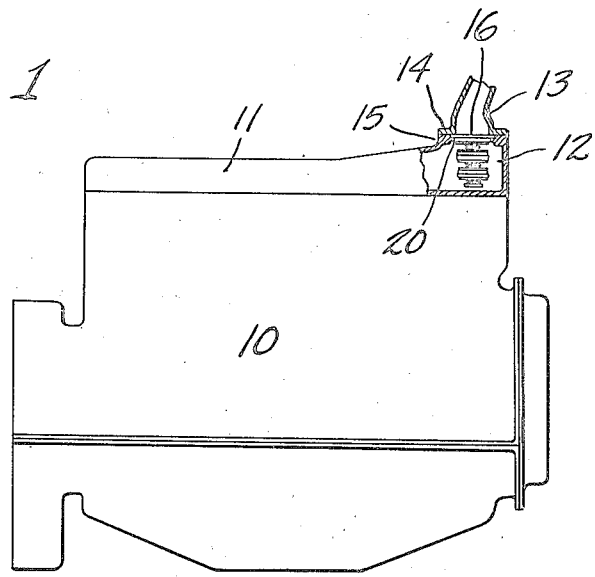
Fig. 1 is a side elevation illustrating diagrammatically an internal combustion engine, certain parts being cut away to show the positioning of my improved device.

I have diagrammatically shown a conventional internal combustion engine 10 having a head 11 thereon within which is a water chamber 12. Communicating with the chamber 12 is a casting or hose nipple 13 having a flanged end 14 engaging with the flanged portion 15 of the head 11 and forming therewith a passageway 16.

A plate 17, having a flanged side 18 terminating in a folded flanged end 19, is positioned in the passageway 16 by placing the end 19 between a shoulder 20 on the inside of the flange 15 and the end 14 of the nipple 13. The plate 17 extends across the passageway 16 and has apertures 21 located in the groove 22 and a central flanged aperture 23. A projecting shoulder 24 is formed on the outer edge of the plate 17 by the groove 22 and the flanged side 18.

A tubular member 25 is inserted and secured in the flanged aperture 23 and a flat disk 50 of thermostatic metal is positioned around the member 25 directly under the plate, with its outer edge bearing against the shoulder 24 and its inner edge slightly spaced from the plate proper.

A plurality of chambers 26 may be formed around the tubular member 25, each enclosing a circle of holes 27 in the tubular member. These chambers 26 are formed by providing a plate 28 around the tubular member 25 having a downwardly flanged side or end 29 with an offset edge 30 overlapping and engaging with an upwardly flanged end 31 of a plate 32. The overlapping edge 30 may be welded, riveted or otherwise joined to the flanged end 31.

Both of the plates 28 and 32 are provided with a groove 33 in which are placed spaced openings 34. Formed by the groove 33 and the side 29 in the plate 28, and the groove 33 and the side 31 in the plate 32, are the projecting shoulders 35 and 36 respectively.

Positioned around the tubular member 25 and over the plate 28 is a disk 37 of thermostatic metal, while a disk 38 is positioned around the tubular member 25 and under the plate 32. The disks 37 and 38 in their closed position bear against the shoulders 35 and 36 respectively, at their outer edges so as to seal the openings 34 from the chamber 12, but are slightly spaced from the plates proper at their inner edges.

As many of the chambers 26 as are desired may be placed upon the tubular member 25. Positioned around the member 25 between the disk 50 and the disk 37 is a coiled spring 39 and in like manner, positioned around the tubular member 25 and between the disks 38 and 37 is a coiled spring 40. Below the disk 38 of the last chamber 26, a coiled spring 43 bears at its bottom against the flanged extending end 41 of a plug 42 that is inserted and secured in the end of the tubular member 25 to seal the bottom of the same. The plug 42 may be secured in place by any one of a number of means, but I have here shown it as being pressed into place within the tube 25. These coiled springs 39, 40 and 43 tend to hold the disks, when in their normal positions, firmly against shoulders 24, 35 and 36 to form a seal between the chamber 12 and the passageway 16.

Figure 2:
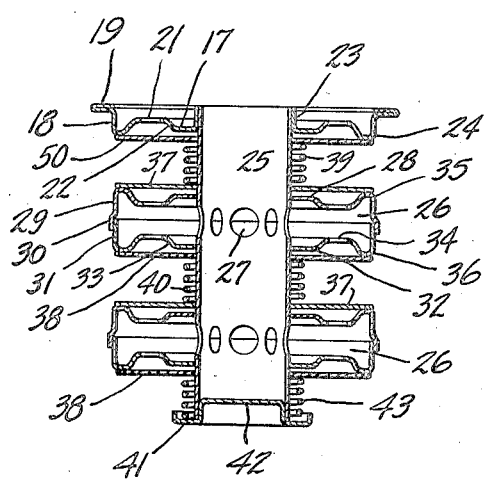
Fig. 2 is an enlarged detailed view showing my improved thermostat in closed position.
Figure 3:
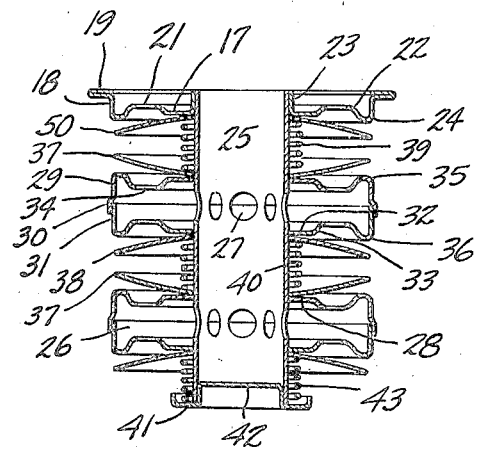
Fig. 3 is a similar enlarged detailed view showing my improved thermostat in opened position.

In the practical operation of my improved device, when the internal combustion engine is relatively cool so that its cooling liquid is likewise cool, the position of the disks will be as shown in Fig. 2 so as to prevent circulation of the water in the engine from the chamber 12 to the passage 16. When the water in the engine becomes heated, however, the plates 26, 37 and 38, being made of thermostatic metal, will begin to bend outwardly so as to bring their inner edges to bear against the plates 17, 28 and 32 respectively, while their outer edges will be moved out of contact with the shoulders 24, 35 and 36 respectively, so as to open the holes 21 and 34 to permit the passage of water therethrough.

Water passing through the holes 21 will naturally proceed through the passage 16 to the radiator for cooling, while the water passing through the holes 34 will pass through the holes 27 in the tubular member 25 and out through the top of the tubular member 25 into the passage 16 and thence to the cooling radiator.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. In combination, a passage, a plate having apertures therein positioned in said passage, a downwardly projecting shoulder around the edge of said plate and a flat temperature responsive disk positioned to bear against said shoulder to open and close said apertures.

2. In combination, a passage, a plate having apertures therein, through which liquids may pass, positioned in said passage, means for securing said plate, a downwardly projecting shoulder around the edge of said plate, and temperature responsive means adapted to bear against said shoulder for opening and closing at least some of said apertures.

3. In combination, a pair of apertured members joined together with their apertures in alignment, to form a continuous passage, a plate, having a projecting shoulder at its outer edge, extending across said passage, means securing said plate between said pair of apertured members, apertures in said plates and temperature responsive disks bearing against said shoulder for opening and closing said latter apertures.

4. In combination, a passage, a plate having a flanged aperture therein positioned across said passage, a tubular member inserted in said flanged aperture and suspended from said plate, apertures in the sides of said tubular member, a chamber around said member enclosing said apertures, openings in said chamber, temperature responsive disks positioned around said tubular member adapted to close said openings and means for holding said disks in place.

5. In combination, a passage, a plate having apertures therein, positioned across said passage, a tubular member inserted in one of said apertures, a shoulder on the outer edge of said plate, a temperature responsive disk positioned on said tubular member and having its outside edge adapted to bear against said shoulder to close the remaining apertures in said plate, apertures in said tubular member, a chamber having openings therein positioned on said tubular member around the apertures therein and temperature responsive means positioned to open and close said openings.

6. In a construction as set forth in claim 5 wherein said chamber is formed of a bottom or base plate, having an upwardly flanged side and a top plate having a downwardly flanged side with an offset edge overlapping and secured to side of said base plate.

7. In a construction as set forth in claim 5 wherein said chamber has a shoulder formed on the top and bottom adjacent the side thereof against which said temperature responsive means may be positioned to close the openings in said chamber.

8. In combination, a passage, a plate having apertures therein positioned across said passage, a tubular member inserted in one of said apertures, a shoulder on the outer edge of said plate, a flat disk of thermostatic metal positioned on said tubular member and having its outside edge adapted to bear against said shoulder to close the remaining apertures in said plate, apertures in said tubular member, a chamber having openings therein positioned on said tubular member around said apertures therein, a shoulder on the top and bottom adjacent the side of said chamber, flat disks of thermostatic metal placed around said tubular member and adapted to bear against said shoulders to close the openings in said chamber, and means adapted to hold said flat disks in their normal position.

9. In a construction as set forth in claim 8, wherein coiled springs are placed between said disks on said tubular member for pressing the flat disks toward their seats.

HARRY T. WOOLSON.